(12) United States Patent
Le et al.

(10) Patent No.: US 6,744,890 B1
(45) Date of Patent: Jun. 1, 2004

(54) KEYPAD MODULE AND ELECTRONIC APPARATUS WITH KEYPAD MODULE

(75) Inventors: Son Quang Le, Fort Worth, TX (US); James Talmage Davis, II, Fort Worth, TX (US)

(73) Assignee: Motorola Inc., Schaumburg, IL (US)

( * ) Notice: Subject to any disclaimer, the term of this patent is extended or adjusted under 35 U.S.C. 154(b) by 467 days.

(21) Appl. No.: 09/629,083

(22) Filed: Jul. 31, 2000

(51) Int. Cl.⁷ .................................................. H04M 1/00
(52) U.S. Cl. .................................. 379/433.07; 379/368
(58) Field of Search ............................ 379/368, 433.07, 379/433.05; 455/556.2, 575.1, 90.3, 551

(56) References Cited

U.S. PATENT DOCUMENTS 5,189,632 A * 2/1993 Paajanen et al. ............ 455/556
5,857,157 A * 1/1999 Shindo ........................ 455/551
6,272,324 B1 * 8/2001 Rudisill et al. ............... 455/90

* cited by examiner

*Primary Examiner*—Jack Chiang
(74) *Attorney, Agent, or Firm*—Matthew C. Loppnow; Charles W. Bethards

(57) ABSTRACT

A keypad module for use with an electronic device has a first side with a first set of keys and a second side having a second set of keys, so that one set of keys at a time can be exposed for the user. The keypad module is movable relative to the electronic device between a first position at which the first set of keys are exposed to the user and a second position at which the second set of keys are exposed to the user.

28 Claims, 3 Drawing Sheets

KEYPAD MODULE AND ELECTRONIC APPARATUS WITH KEYPAD MODULE

FIELD OF THE INVENTION

In general, the present invention relates to the field of keypads, more particularly, to a keypad that is used with an electronic device to input information and/or commands to the electronic device.

BACKGROUND OF THE INVENTION

Keypads for inputting information and/or commands into electronic devices are well known. For example, telephone-type keypads are well known for telephones of the corded, cordless and wireless types of telephones. These telephone keypads typically have twelve buttons, corresponding to each of the ten single digits as well as the * (star) and # (pound) symbols. Known telephone keypads can have alphabetic letters assigned to the number keys, and it is possible to enter alphabetic information using these keys. In one known arrangement, three letters are assigned to each of several number keys, and pressing the same number key more than once selects the letter. For example, if the number two (2) key is assigned the letters A, B, and C, then when in an alphabetic mode, pressing the number two key once will select letter A, pressing it a second time will select the letter B, and pressing it a third time will select the letter C. This arrangement has been used to allow a telephone keypad to be able to enter both numeric and alphabetic information into a telephone. An advantage of this arrangement is that a small number of keys, such as only twelve keys, is required. In situations where the space available for the keypad is small, such as a portable cordless or wireless (e.g., cellular) telephone, it is possible to use this arrangement to make each of the keys relatively large with respect to the small area that is available for the keypad. In portable telephones such as cordless or wireless (e.g., cellular) telephones, it is often desirable to make the telephone, and hence the keypad area, compact. Having fewer keys permits each key to be larger and still fit the compact space. However, for text (alphabetic) entry, the need to hit keys multiple times is a disadvantage, because of the requirement for a complex data-entry user-interface.

Another type of keypad used to input information and/or commands into an electronic device is the alphabetic-type keypad. One example of such a keypad is the so-called "QWERTY" keypad, which has one key assigned to each of the letters of the alphabet. Such a keypad may also have separate keys for the ten single number digits, and for additional command functions. These keypads provide the advantage of a simple data-entry user-interface in that only one keystroke is required to enter each letter. However, these keypads suffer the disadvantage that at least twenty-six keys are required. If this number of keys is to be fit into a compact space, such as the compact space on a portable telephone, the keys will likely need to be smaller than the keys that could be fit on the same space using the telephone keypad described above. These smaller keys may be less convenient to operate due to their size in circumstances where only numeric entry (such as telephone dialing) is being performed.

When using many electronic devices, a user may sometimes desire to have fewer, larger keys (e.g., when primarily making telephone calls from a cordless or wireless phone) and may at other times desire a greater number of keys (e.g., an alphabetic keypad when entering larger amounts of text data into the wireless telephone or other electronic device). Accordingly, there exists a need to provide an improved keypad that is adaptable between different configurations while still occupying a limited space.

DETAILED DESCRIPTION OF THE PREFERRED EMBODIMENT

Figure 1:
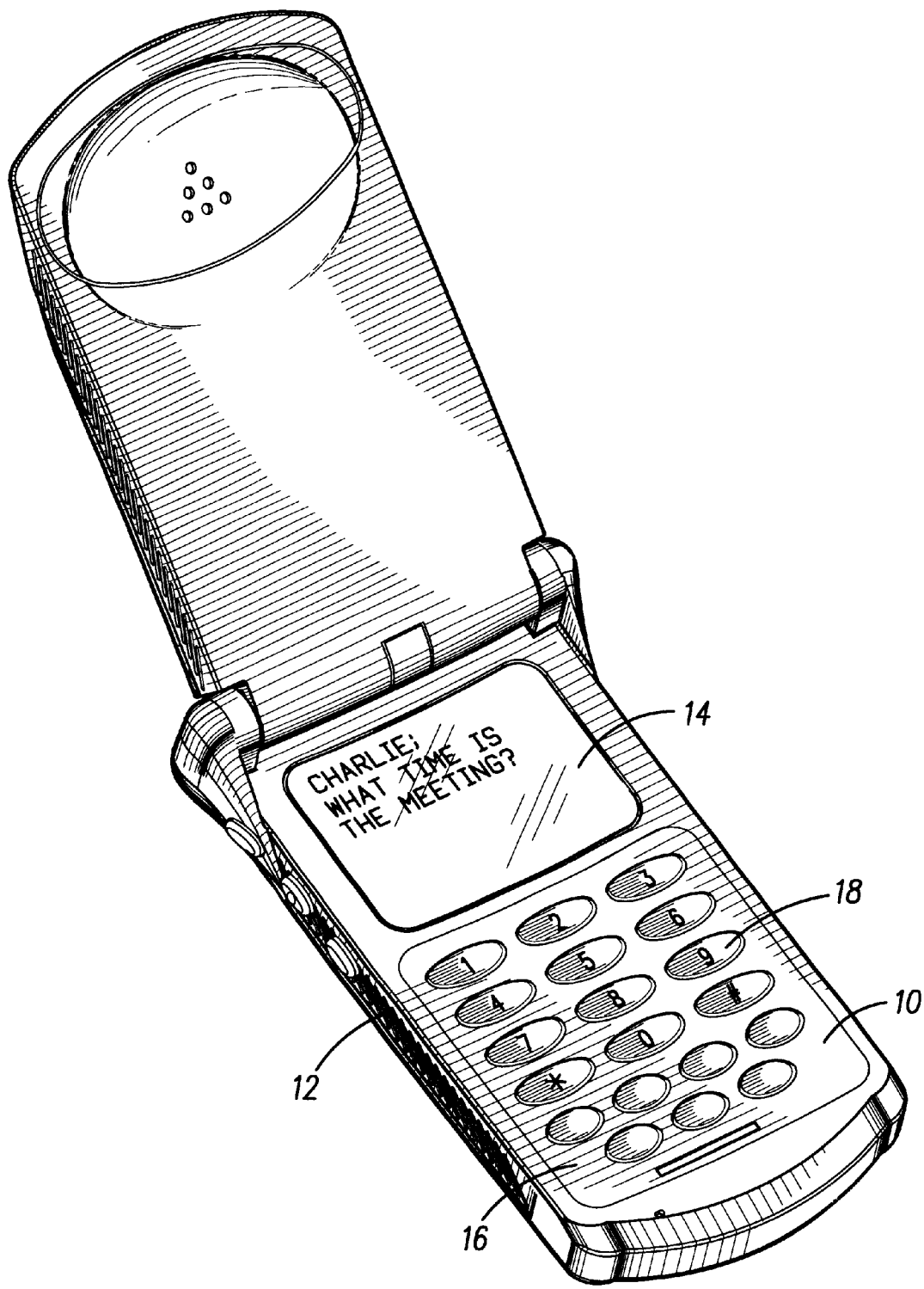
FIG. 1 is a perspective view illustrating a preferred embodiment in accordance with the invention, showing a keypad module installed in a cellular telephone with numeric telephone-type keys exposed.

The present disclosure concerns a keypad module for use with an electronic device, and an electronic device having such a keypad module. The module has a first side with a first set of keys and a second side having a second set of keys, so that one set of keys at a time can be exposed for the user. The keypad module is movable relative to the electronic device between a first position at which the first set of keys are exposed to the user and a second position at which the second set of keys are exposed to the user.

In one exemplary embodiment, the first and second sides face outwardly from the module away from each other and are opposed to each other, and the module is removably mountable to the device and can be selectively mounted in the first position or the second position. Another aspect of an embodiment is the module is reversibly mountable between the first position and the second position. In another aspect of an exemplary embodiment, the keypad module has an interface that provides for communication of information from the keypad module to the electronic device. In a more detailed aspect, the interface may provide information to the electronic device identifying which set of keys is exposed.

According to one of the more detailed features of a preferred embodiment, the first set of keys includes at least a numeric telephone-type set of keys, and the second set of keys includes at least an alphabetic-type set of keys, so that a first number of the first keys differs from a second number of the second keys, and a first size of at least one of the first keys differs from a second size of at least one of the second keys.

In another exemplary embodiment, the invention also relates to an electronic apparatus having a keypad module and an electronic device.

According to one of the more detailed features of a preferred embodiment, the electronic device has a receiving portion in the form of a recessed portion, and the keypad module is at least partially inserted into the recessed portion.

According to another more detailed feature, the electronic device has an elastomeric data connector located in the receiving portion, having first electrical contacts, and the keypad module comprises a first set of contacts on the first side of the module and a second set of contacts on the second side of the module, such that the first contacts contact the elastomeric data connector when the module is in one position and the second contacts contact the elastomeric data connector when the keypad module is in another position.

In yet another more detailed aspect of a preferred embodiment, the electronic device may include any suitable electronic device, such as by way of example at least one of a corded telephone, a wireless telephone, a wireless data transmission device, a personal digital assistant, and a remote control device.

In still another more detailed embodiment, a display is associated with the electronic device, and the display is capable of displaying information in more than one mode and switches from one mode to another mode depending upon which side of the keypad module is exposed.

Referring to FIG. 1, a keypad module 10 according to an embodiment of the present invention is shown installed in a cellular telephone 12 having a display 14. In FIG. 1, the keypad module 10 is illustrated in an installed state with a side 16 having telephone-type numeric keys 18 being exposed to the user.

Figure 2:
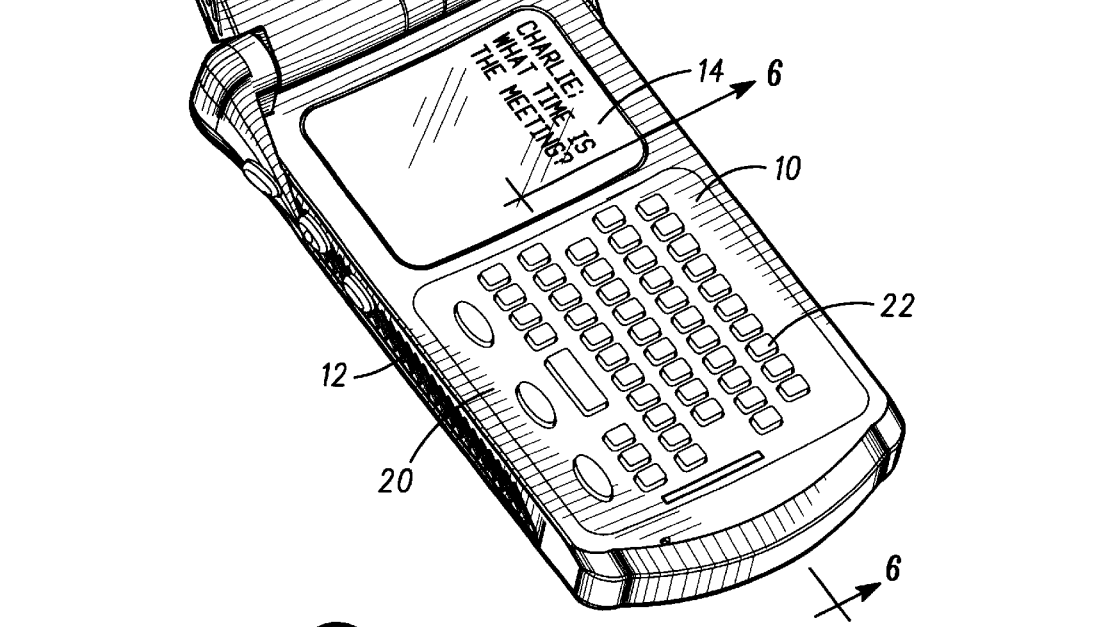
FIG. 2 is a perspective view of the embodiment of FIG. 1 showing the keypad module with an alphabetic-type keys exposed.

Referring to FIG. 2, the keypad module 10 is showed installed in the cellular telephone 12 in a different orientation with a side 20 having alphabetic-type keys 22 exposed for the user.

In FIGS. 1 and 2, a cellular telephone 12 is used as an example of an electronic device in which the keypad module 10 could be used. However, the keypad module 10 according to the present invention could be used with any of various electronic devices in which numeric and/or textual data and/or commands are to be entered, including for example corded telephones, cordless telephones, pagers, wireless telephones including cellular telephones, personal digital assistants including wireless personal digital assistants, corded or wireless keyboard units used with personal computers or TV set-top boxes, remote controllers for electronic devices, or any other application where it may be desirable to provide more than one key configuration.

Figure 3:
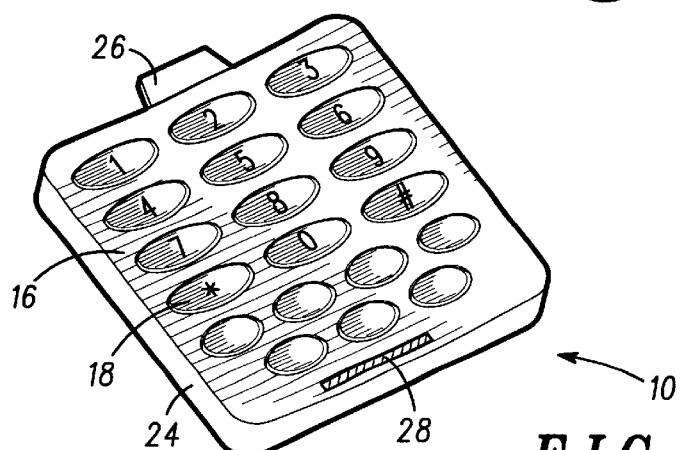
FIG. 3 is a perspective view of a keypad module according to the present invention, with a side of the module having the telephone-type numeric keys exposed.

Referring to FIG. 3, the keypad module 10 has a first side 16 as part of a housing 24, with a plurality of keys 18 disposed on the first side 16. A projection 26 extends from one end of the housing 24 to facilitate mounting of the keypad module 10 on an electronic device. The first side 16 also has a contact area 28, which can transmit/receive data to/from the electronic device. The contact area 28 is formed by a suitable number of conductive contacts accessible through an aperture in the first side 16.

Figure 4:
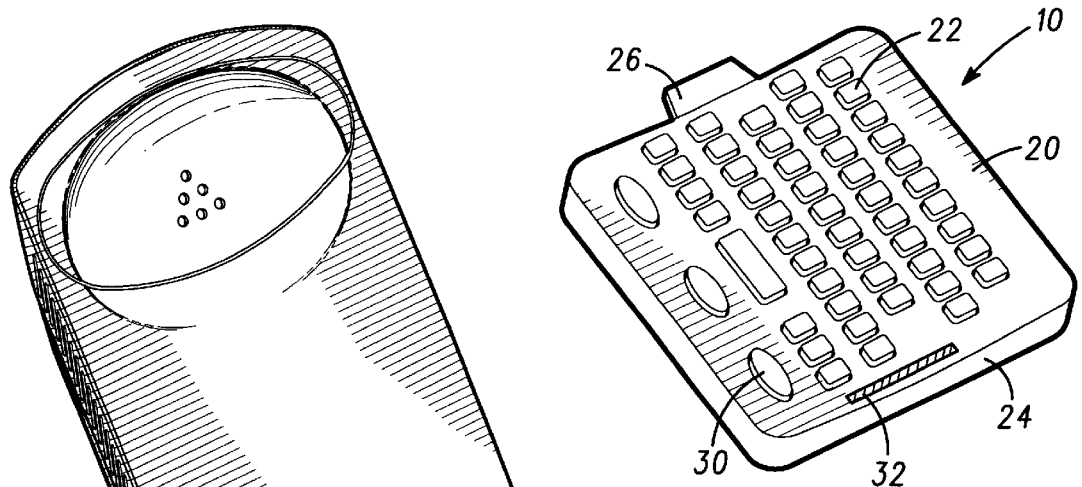
FIG. 4 is a perspective view of the embodiment of FIG. 3, with a side of the module having the alphabetic-type keys exposed.

FIG. 4 shows the keypad module 10 of FIG. 3, with a second side 20 having a plurality of alphabetic keys 22 in a "QWERTY" format and additional function keys 30 (such as a space key and shift keys) disposed on the second side 20. The second side 20 also has a contact area 32, which can transmit/receive data to/from electronic device. The contact area 32 is formed by a suitable number of conductive contacts accessible through an aperture in the second side 20.

The exemplary illustrated embodiment depicts telephone-type keys on the first side 16 and alphabetic and function keys on the second side 20. However, these are examples only, and the invention may be used to provide any suitable different key arrangements on different sides. For example, where an electronic device has two modes of operation, it may be desirable to put keys corresponding to one mode on one side of the keypad module and keys corresponding to the second mode on the second side. In other cases, it may simply be desirable to put different arrangements, numbers, sizes, or types of keys on the different sides of the keypad module.

It may also be desirable to have interchangeable modules of different types, so that multiple types of keypad modules can be installed and used with a single electronic device, with each module being capable of conveying key type information to the electronic device. Based on an inserted keypad and its position within the device, a controller in the device can select the operating mode of the device. For example, based on the exposed side of the keypad module 10, the device may operate in the first or second operating mode, when its is turned on. In addition, the display 14 may be switched between more than one mode depending on which side of the keypad module 10 is exposed. For example, the orientation of information in the display may be rotated 90° (e.g., from a portrait orientation to a landscape orientation), depending on the orientation of the exposed keys.

Figure 5:
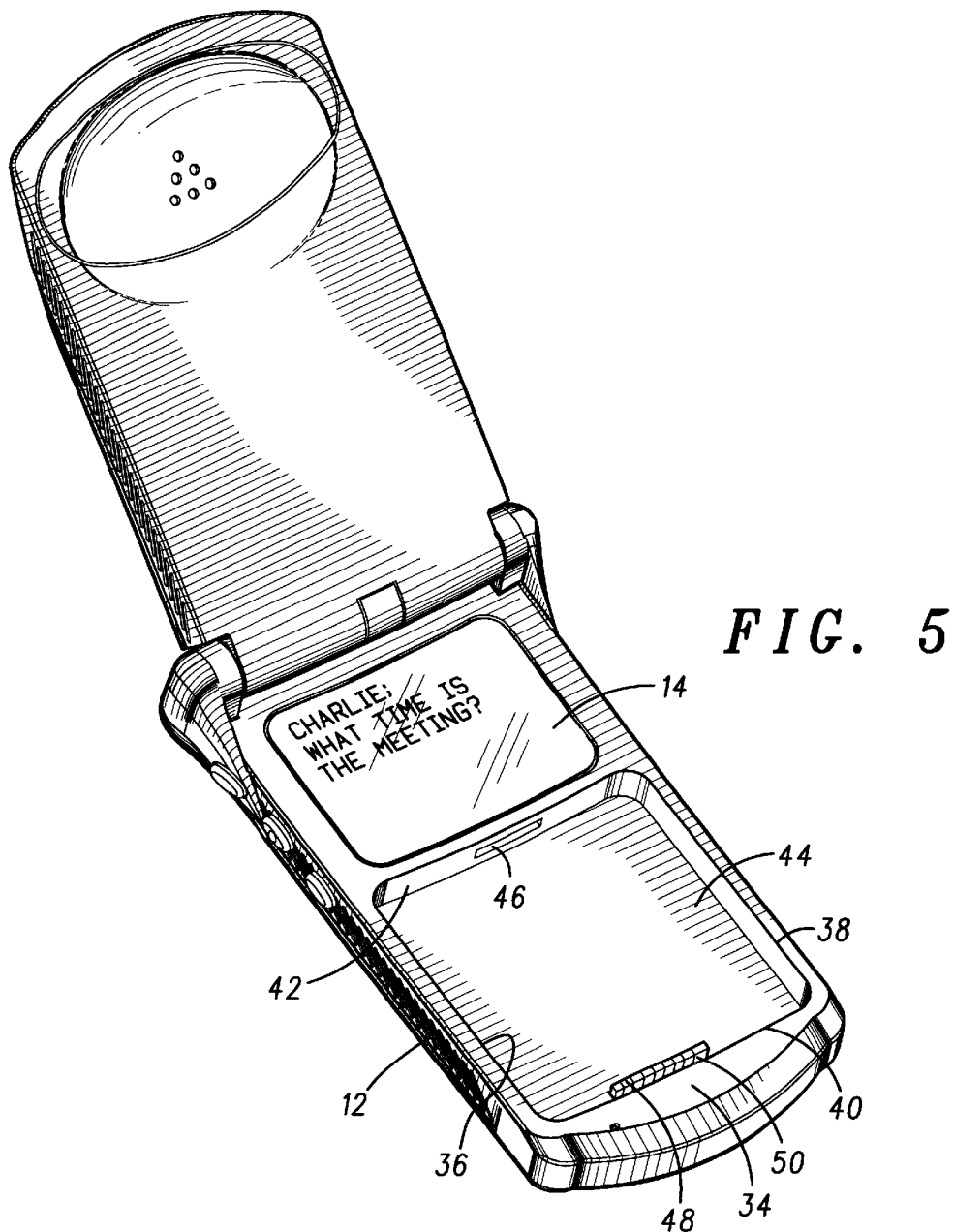
FIG. 5 is a perspective view depicting a cellular telephone suitable for use with the keypad module shown in FIGS. 3 and 4, shown with the keypad module removed.

Referring to FIG. 5, a cellular telephone 12 with which the keypad module 10 shown in FIGS. 3 and 4 can be used is depicted. The cellular telephone 12 includes a display 14 disposed on a housing 34. The housing 34 has a mounting area 36 for receiving the keypad module 10. The mounting area 36 in this embodiment is formed by a recess having two opposed sidewalls 38, and end wall 40, and an end wall 42. A bottom wall 44 also forms the recess. The end wall 42 has an indentation 46 shaped to receive the projection 26 on the keypad module 10. An elastomeric connector 48 projects through the bottom wall 44, and includes contacts 50 that are electrically connectable with the contact strips 28 and 32 shown in FIGS. 3 and 4.

In the illustrated embodiment, when the keypad module 10 is installed in the cellular telephone 12 with its first side 16 facing upward, the contacts 50 are in contact with the contact strip 32 on the keypad module 10. Conversely, when the keypad module 10 is installed in the cellular telephone 12 with the second side 20 exposed, the contacts 50 are in contact with the contact strip 28 on the keypad module 10. However, other methods of operatively connecting the keypad with the electronic device may be used. For example, a single set of contacts could be disposed on or near the projection 26 of the keypad module 10 that would interact with contacts disposed at or near the indentation 46 on the cellular telephone 12. Any other suitable interface for providing communication from the keypad module 10 to the cellular telephone 12 may be used. For example, infrared or electromagnetic communication may be used between the keypad module 10 and the cellular telephone 12.

When in either of the two installed positions, the keypad module 10 is releasably retained in the cellular telephone 12 by a friction-fit or snap-fit engagement. Specifically, the projection 26 engages the indentation 46, and the elastomeric connector 48 frictionally engages with the appropriate one of apertures in the keypad module 10 that are provided around the contact strips 28 and 32. This provides a releasable mounting arrangement. However, other types of mounting arrangements may be used to mount the keypad module 10 on the cellular telephone 12 so that the appropriate side of the keypad is exposed to the user. Further, in the preferred embodiment, the keypad module is removable, but it could simply be movably mounted to be movable between different orientations.

Figure 6:
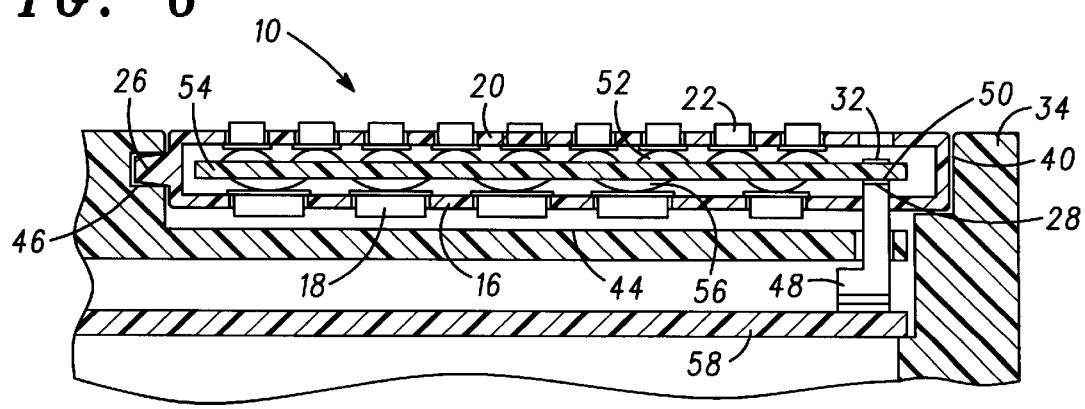
FIG. 6 is a side cut-away sectional view of the keypad module of FIG. 2 in an installed state in a cellular telephone, taken through Section line 6—6.

Referring now to FIG. 6, the interior structure of the keypad module 10 and associated parts of the cellular telephone 12 are shown in more detail. In FIG. 6, the keypad module 10 is shown installed in the cellular telephone 12 with the alphabetic keys 22 exposed. The alphabetic keys 22 are provided on the second side 20 and are operatively associated with popple domes 52 so that pressing a key 22 interacts with printed circuit board 54. The general operation of how popple domes 52 interact with a printed circuit board 54 is known in the art. The first side 16 of the keypad module 10 has keys 18, which interact with popple domes 56, which also interact with the printed circuit board 54. The elastomeric connector 48 has contacts 50 that are in electrical connection with contacts 28 that are connected to the printed circuit board 54. In the illustrated embodiment, the contacts 28 are accessible through an aperture in the first side 16. The elastomeric connector 48 extends into the aperture and provides a resilient frictional fit that urges the module 10 in the direction of arrow A, and that tends to hold the keypad module 10 in a cellular telephone 12 by urging the projection 26 into indentation 46. The elastomeric connector 48 has contacts 50 that engage the contacts 28 at one end thereof in the installed state shown. At its other end, the elastomeric connector 48 is electrically connected to a controller printed circuit board 58 of the cellular telephone. When the keypad module 10 is installed in the reversed position from that shown in FIG. 6, i.e., with the first side 16 facing up, the elastomeric connector 48 would extend through the aperture in the second side 20, and the contacts 50 would be in electrical connection with the contacts 32.

From the foregoing description it will be appreciated that the present invention provides a keypad module for use with an electronic device, and an electronic device having such a keypad module, having a first side with a first set of keys and a second side having a second set of keys, so that one set of keys at a time can be exposed for the user.

The interaction of the contacts 50 with the contacts 28 and 32 provides communication to the cellular telephone 12 corresponding to the keystrokes made on the exposed keys. The contacts 50 can also indicate to the cellular telephone 12 which set of keys is exposed. For example, one or more set of the contacts 28 and 32 may have an extra contact point that signals to the cellular telephone 12 which side is exposed. This indication may be used by a controller (not shown) within the cellular telephone 12 to switch between operating modes or for example to rotate the display of information in the display 14. The contacts 50 may also provide power to the keypad module 10, for example to provide key illumination.

Although the preferred embodiment is illustrated as having two sides each having keys, the keypad module could have keys on any number of sides. The invention further provides a keypad module wherein different modules having different key arrangements can be interchanged. For example, different modules having keys for different languages (including Braille) can be provided and interchangeably installed in the electronic device. Benefits of an interchangeable keypad module are present even if there are keys on only one side of the module. In another variation, where the keypad area is limited, but the depth is sufficient, the module can have four sides of similar area, each having different key arrangements thereon.

Preferred embodiments in accordance with the invention has been described in detail with respect to preferred embodiments, and it will now be apparent from the foregoing to those skilled in the art that changes and modifications can be made without departing from the invention in its broader aspects, and the invention, therefore, as defined in the claims is intended to cover all such changes and modifications as fall within the true spirit of the invention.

What is claimed is:

1. A keypad module for entering data into an electronic device, comprising:
    a first side having a first set of one or more first keys; and
    a second side having a second set of one or more second keys, wherein the module is movable relative to the electronic device between a first position at which the first set of keys are exposed to the user and a second position at which the second set of keys are exposed to the user,
    wherein the module is removably mountable to the device and can be selectively mounted in the first position and the second position, and
    wherein the second set of keys comprises at least an alphabetic-type set of keys.

2. A keypad module according to claim 1, further comprising an interface, that provides communication from the keypad module to the electronic device.

3. A keypad module according to claim 1, wherein the first and second sides face outwardly from the module away from each other and are opposed to each other.

4. A keypad module according to claim 1, wherein the selectively mounted module in the first position and the second position module selects the operating mode of the electronic device.

5. A keypad module according to claim 1, wherein the first set of keys comprises at least a numeric telephone-type set of keys.

6. A keypad module according to claim 1, wherein a first number of the first keys differs from a second number of the second keys.

7. A keypad module according to claim 1, wherein a first size of at least one of the first keys differs from a second size of at least one of the second keys.

8. An electronic apparatus, comprising:
    an electronic device; and
    a keypad module connected to the electronic device for entering data into the electronic device, the keypad module comprising:
        a first side having a first set of one or more first keys; and
        a second side having a second set of one or more second keys, wherein the module is movable relative to the electronic device between a first position at which the first set of keys are exposed to the user and a second position at which the second set of keys are exposed to the user,
    wherein the electronic device comprises a first housing having a receiving portion for receiving the keypad module,
    wherein the keypad module is removably mountable to the receiving portion, and
    wherein the second set of keys comprises at least an alphabetic set of keys.

9. An electronic apparatus according to claim 8, further comprising an interface that provides communication from the keypad module to the electronic device.

10. An electronic device according to claim 8, wherein the first and second sides face outwardly from the module away from each other and are opposed to each other.

11. An electronic device according to claim 8, wherein the receiving portion comprises a recessed portion, and the keypad module is at least partially inserted into the recessed portion.

12. A keypad module according to claim 11, wherein the electronic device comprises an elastomeric data connector located in the receiving portion, having first electrical contacts, and wherein the keypad module comprises a first set of contacts on the first side thereof and a second set of contacts of the second side thereof, wherein the first contacts contact the elastomeric data connector when the module is in the second position and the second contacts contact the elastomeric data connector when the keypad module is in the first position.

13. An electronic apparatus according to claim 8, wherein the selectively mounted module in the first position and the second position module selects the operating mode of the electronic device.

14. An electronic apparatus according to claim 8, further comprising a display associated with the electronic device, wherein the display is capable of displaying information in more than one mode, and the display switches from one mode to another mode depending upon which side of the keypad module is exposed.

15. An electronic apparatus according to claim 8, wherein the first set of keys comprises at least a numeric keypad set of keys.

16. An electronic apparatus, comprising:

an electronic device; and a keypad module connected to the electronic device for entering data into the electronic device, the keypad module comprising
   a first side having a first set of one or more first keys; and
   a second side having a second set of one or more second keys, wherein the module is removable relative to the electronic device between a first position at which the first set of keys are exposed to the user and the second set of keys are concealed by the electronic device and a second position at which the second set of keys are exposed to the user and the first set of keys are concealed by the electronic device,
   wherein the second set of one or more keys comprises at least an alphabetic set of keys having one key assigned to each letter of an alphabet.

17. The electronic apparatus according to claim 16,
wherein the first side further comprises a first contact area including an aperture and conductive contacts, and
wherein the second side further comprises a second contact area including an aperture and conductive contacts.

18. The electronic apparatus according to claim 17, wherein the electronic device comprises a bottom wall having an elastometric connector projecting through the bottom wall, the elastometric connector configured to couple with at least one of the first contact area and the second contact area.

19. The electronic apparatus according to claim 17,
wherein the electronic device comprises an indentation, and wherein the keypad module her comprises a projection configured to engage the indentation, the projection being located at an end of the keypad module substantially opposite from the first contact area.

20. The electronic device according to claim 16,
wherein the electronic device comprises a first housing having a receiving portion for receiving the keypad module,
wherein the receiving portion comprises a recessed portion, and the keypad module is at least partially inserted into the recessed portion so that the recessed portion substantially surrounds the entire keypad module.

21. A cellular telephone, comprising:

means for receiving electronic device data; and means for entering data into the cellular telephone, the means for entering data comprising:
   means for removably coupling the means for entering data to the means for receiving electronic device data;
   a first side having a first means for entering data corresponding to a first mode of operation; and
   a second side having a second means for entering data corresponding to a second mode of operation,
wherein the first means for entering data comprises a numeric set of keys having a separate key assigned to each single digit of a numeric system, and
wherein the second means for entering data comprises an alphabetic set of keys having a separate key assigned to each letter of an alphabet.

22. The cellular telephone according to claim 21, further comprising a means for providing communication from the means for entering data to the means for receiving electronic device data.

23. An electronic device according to claim 21, wherein the first and second sides face outwardly from the means for entering data away from each other and are opposed to each other.

24. An electronic device according to claim 21, wherein the means for receiving electronic device data comprises a means for receiving the means for entering data.

25. A keypad module according to claim 1, wherein the alphabetic-type set of keys comprises a keypad having separate keys assigned to each letter of an alphabet.

26. A keypad module according to claim 1, wherein the alphabetic-type set of keys comprises a QWERTY keypad.

27. An electronic apparatus according to claim 8, wherein the alphabetic set of keys comprises a keypad having separate keys assigned to each letter of an alphabet.

28. An electronic apparatus according to claim 8, wherein the alphabetic set of keys comprises a QWERTY keypad.

* * * * *